United States Patent
Taira et al.

(10) Patent No.: US 11,345,032 B2
(45) Date of Patent: May 31, 2022

(54) AUTONOMOUS MOVING BODY AND CONTROL PROGRAM FOR AUTONOMOUS MOVING BODY

(71) Applicant: TOYOTA JIDOSHA KABUSHIKI KAISHA, Toyota (JP)

(72) Inventors: Tetsuya Taira, Nagakute (JP); Daisaku Honda, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 16/407,295

(22) Filed: May 9, 2019

(65) Prior Publication Data

US 2019/0381662 A1 Dec. 19, 2019

(30) Foreign Application Priority Data

Jun. 15, 2018 (JP) .............................. JP2018-114574

(51) Int. Cl.
*G05D 1/02* (2020.01)
*B25J 9/16* (2006.01)
*G05D 1/00* (2006.01)
*B25J 13/08* (2006.01)

(52) U.S. Cl.
CPC ............. *B25J 9/1666* (2013.01); *B25J 9/162* (2013.01); *B25J 9/1684* (2013.01); *B25J 13/089* (2013.01); *G05D 1/0088* (2013.01)

(58) Field of Classification Search
CPC ...... B25J 9/1676; B25J 9/1664; B25J 9/1666; B25J 9/1684; B25J 13/089; B25J 9/162; G05D 1/0214; G05D 1/0219

USPC ......... 700/245, 253; 340/988, 686.1, 870.16, 340/686.6

See application file for complete search history.

(56) References Cited

U.S. PATENT DOCUMENTS

| | | | | |
|---|---|---|---|---|
| 6,292,725 B1 * | 9/2001 | Kageyama | ........... | G05D 1/0297 701/23 |
| 10,037,696 B2 * | 7/2018 | Laur | ...................... | G05D 1/021 |
| 10,126,747 B1 * | 11/2018 | Svec | ...................... | G01C 21/20 |

(Continued)

FOREIGN PATENT DOCUMENTS

| | | |
|---|---|---|
| JP | 2008-254134 A | 10/2008 |
| JP | 2009-134642 A | 6/2009 |
| JP | 2015-035139 A | 2/2015 |

*Primary Examiner* — Dalena Tran
(74) *Attorney, Agent, or Firm* — Oliff PLC

(57) ABSTRACT

An autonomous moving body capable of appropriately avoiding an approaching autonomous moving body and efficiently executing a given task even when the autonomous moving bodies are not controlled by a single system or without intercommunication between them and a control program for the autonomous moving body are provided. An autonomous moving body moves along a planned moving path in order to execute a given task, and includes an external sensor that recognizes another autonomous moving body given another task and an operation state thereof, an avoidance determination unit that determines, when it predicts that the autonomous moving body and the another autonomous moving body recognized by the external sensor may come into contact with each other as they approach each other, whether to avoid the another autonomous moving body, and a movement control unit that controls a movement unit based on the determination of the avoidance determination unit.

7 Claims, 12 Drawing Sheets

(56) References Cited

U.S. PATENT DOCUMENTS

| | | |
|---|---|---|
| 2008/0249660 A1 | 10/2008 | Nakamura |
| 2008/0249662 A1* | 10/2008 | Nakamura ........... B62D 57/032 |
| | | 700/253 |
| 2009/0143931 A1 | 6/2009 | Sekiya |
| 2009/0234499 A1* | 9/2009 | Nielsen .................. B25J 9/1666 |
| | | 700/250 |
| 2013/0184980 A1* | 7/2013 | Ichikawa ............... B25J 9/1676 |
| | | 701/301 |
| 2015/0046018 A1 | 2/2015 | Hayashi et al. |
| 2018/0120852 A1* | 5/2018 | Cho ....................... G05D 1/027 |

* cited by examiner

AUTONOMOUS MOVING BODY AND CONTROL PROGRAM FOR AUTONOMOUS MOVING BODY

CROSS REFERENCE TO RELATED APPLICATIONS

This application is based upon and claims the benefit of priority from Japanese patent application No. 2018-114574, filed on Jun. 15, 2018, the disclosure of which is incorporated herein in its entirety by reference.

BACKGROUND

The present disclosure relates to an autonomous moving body and a control program for an autonomous moving body.

An autonomous moving robot that executes a given task under a specific environment is known. For example, Japanese Unexamined Patent Application Publication No. 2015-035139 discloses a technique of controlling a robot so that the robot, which is an autonomous moving body, moves while avoiding an obstacle that may interfere during movement.

SUMMARY

When one autonomous moving body executes a task under a specific environment, it can perform a smooth autonomous movement while avoiding an obstacle. However, recently, there are increasing situations in which a plurality of autonomous moving bodies respectively execute different tasks given to them under a specific environment. Under such a situation, it is difficult for autonomous moving bodies to cooperate with each other to adjust moving paths, and thus a smooth autonomous movement is prevented. In particular, when two autonomous moving bodies may come into contact with each other as they approach each other, if the avoidance paths of the autonomous moving bodies overlap, another avoidance operation is performed, which significantly lowers work efficiency.

The present disclosure has been made to solve such a problem and provides an autonomous moving body capable of appropriately avoiding an approaching autonomous moving body and efficiently executing a given task even when the autonomous moving bodies are not controlled by a single system or without intercommunication between them and a control program for the autonomous moving body.

A first example aspect of the present disclosure is an autonomous moving body that moves along a planned moving path in order to execute a given task. The autonomous moving body includes: an external sensor configured to recognize another autonomous moving body to which another task is given and an operation state thereof; an avoidance determination unit configured to determine, when it predicts that there is a possibility that the autonomous moving body and the another autonomous moving body recognized by the external sensor may come into contact with each other as they approach each other, whether to avoid the another autonomous moving body; and a movement control unit configured to control a movement unit based on the determination of the avoidance determination unit.

When the external sensor recognizes the another autonomous moving body and the operation state thereof, and when it is predicted that there is a possibility that the autonomous moving body and the another autonomous moving body recognized by the external sensor may come into contact with each other, it is determined whether to avoid the another autonomous moving body. Thus, it is possible to appropriately avoid the another autonomous moving body according to the state and efficiently execute given task even when the autonomous moving bodies are not controlled by a single system or without intercommunication between them.

In the above autonomous moving body, when the avoidance determination unit recognizes that the another autonomous moving body is of the same type as that of the autonomous moving body, it may determine to avoid the another autonomous moving body based on an avoidance rule that is preset commonly to the autonomous moving body of the same type as that of the autonomous moving body and the autonomous moving body. By making such a determination, the avoidance determination unit can perform the avoidance operation based on the avoidance rule that is common to the another autonomous moving body and the autonomous moving body. This prevents the avoidance paths of the autonomous moving body and the another autonomous moving body from overlapping each other.

In the above autonomous moving body, the external sensor may continuously recognize the another autonomous moving body and the operation state thereof after the autonomous moving body starts moving along an avoidance path planned based on the avoidance rule, and when the avoidance determination unit predicts again that there is a possibility that the autonomous moving body may come into contact with the another autonomous moving body recognized by the external sensor, it may determine whether to further avoid the another autonomous moving body. By making such a determination, it is possible to execute a given task safely even when an autonomous moving body of the same type as that of the autonomous moving body does not execute the expected avoidance operation.

In the above autonomous moving body, when the avoidance determination unit recognizes the another task executed by the another autonomous moving body from the operation state, it may determine whether to avoid the another autonomous moving body based on a comparison between the task given to the autonomous moving body and the another task. For example, when a task of the another autonomous moving body is urgent, movement of another autonomous moving body can be prioritized. By making such a determination, it is possible to perform a pseudo cooperative operation with the another autonomous moving body even when the autonomous moving bodies are not controlled under the same system.

The above autonomous moving body may further include a presentation unit configured to present, to the outside, an operation state of the autonomous moving body when the autonomous moving body avoids the another autonomous moving body. Such a presentation unit enables the autonomous moving body to prompt the another autonomous moving body to perform the avoidance operation according to the operation state of the autonomous moving body.

In the above autonomous moving body, when the autonomous moving body avoids the another autonomous moving body by the avoidance path in which a proceeding direction of the autonomous moving body is changed to diagonally forward of the moving path, the movement control unit may set a first angle, which is an angle formed by the moving path and a first avoidance path if a distance between the autonomous moving body and the another autonomous moving body is a first distance, in such a way that it becomes larger than a second angle, which is an angle formed by the moving path and a second avoidance path if the distance between the autonomous moving body and the another autonomous moving body is a second distance which is larger than the first distance. Such a setting enables the autonomous moving body to smoothly avoid the another autonomous moving body when turning to avoid the another autonomous moving body.

The autonomous moving body may further include a communication unit configured to perform intercommunication with the another autonomous moving body. The movement control unit may be configured to control, while the intercommunication is established, the movement unit based on a communication result of the intercommunication regardless of the determination of the avoidance determination unit. If intercommunication is possible, cooperative operation with the another autonomous moving body may be performed by the intercommunication. It is safer for the autonomous moving bodies to communicate with each other and determine the own movement operation. On the other hand, even when communication is not established, the autonomous moving body can stably perform the avoidance operation by the determination of the avoidance determination unit.

A second example aspect of the present disclosure is a control program for an autonomous moving body that moves along a planned moving path in order to execute a given task. The control program causes a computer to execute: recognizing another autonomous moving body to which another task is given and an operation state thereof; determining, when it is predicted that there is a possibility that the autonomous moving body and the another autonomous moving body recognized in the recognizing may come into contact with each other as they approach each other, whether to avoid the another autonomous moving body; and controlling a movement unit based on the determination in the determining.

When the external sensor recognizes the another autonomous moving body and the operation state thereof, and when it is predicted that there is a possibility that the autonomous moving body and the another autonomous moving body recognized by the external sensor may come into contact with each other, it is possible to appropriately avoid the another autonomous moving body according to the state and efficiently execute given task even when the autonomous moving bodies are not controlled by a single system or without intercommunication between them.

According to the present invention, it is possible to provide an autonomous moving body and capable of appropriately avoiding an approaching autonomous moving body and efficiently executing a given task even when the autonomous moving bodies are not controlled by a single system or without intercommunication between them and a control program for the autonomous moving body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the present disclosure, the present disclosure according to claims is not limited to the following embodiments. Moreover, all the components described in the following embodiment are not necessarily indispensable for means to solve problems.

Figure 1:
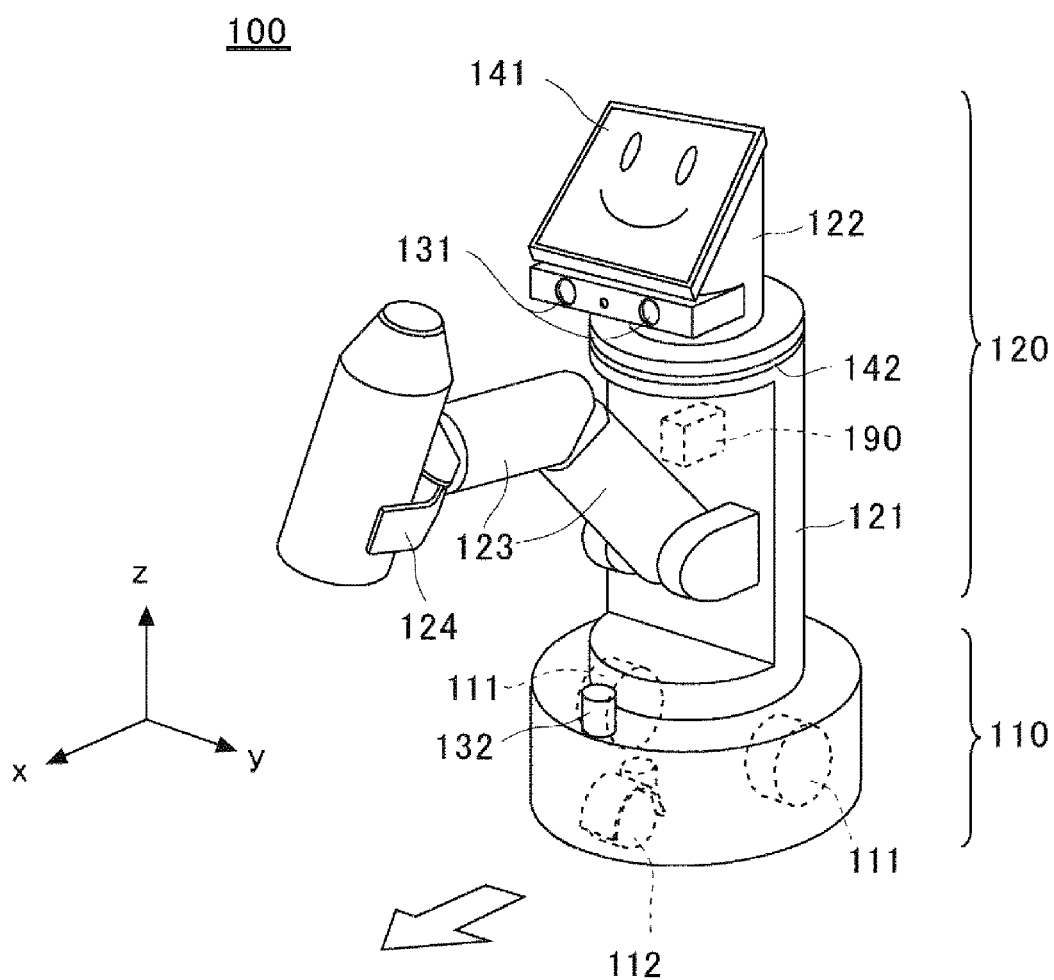
FIG. 1 is an external perspective view of a moving robot according to an embodiment.

FIG. 1 is an external perspective view of a moving robot 100 according to this embodiment. The moving robot 100 is an example of an autonomous moving body. The moving robot 100 is mainly composed of a carriage unit 110 and a main unit 120.

The carriage unit 110 supports two drive wheels 111 and one caster 112, each of which is grounded on a travel surface, in a cylindrical case. The two drive wheels 111 are disposed so that the centers of their rotation axes coincide with each other. Each drive wheel 111 is independently and rotationally driven by using a motor (not shown). The drive wheel 111 is an example of a movement unit for moving the moving robot. The caster 112 is a driven wheel and provided so that a rotating shaft extending in a vertical direction from the carriage unit 110 pivotally supports the wheel apart from the rotation axis of the wheel. Further, the caster 112 follows the carriage unit 110 in accordance with a moving direction thereof.

For example, the moving robot 100 goes straight when the two drive wheels 111 are rotated at the same speed in the same direction, and rotates around the vertical axis passing through the center of two drive wheels 111 of the carriage unit 110 when the two drive wheels 111 are rotated at the same speed in the reverse direction. That is, the moving robot 100 can move parallel to and rotate in a predetermined direction by controlling a turning direction and a turning speed of each of the two drive wheels 111.

The carriage unit 110 includes a laser scanner 132 on a peripheral part of the upper surface thereof. The laser scanner 132 scans a certain range in a horizontal surface for each step angle, and outputs whether there is an obstacle in each of the directions. Further, when there is an obstacle, the laser scanner 132 outputs a distance to the obstacle.

The main unit 120 mainly includes a body part 121 mounted on an upper surface of the carriage unit 110, a head part 122 placed on an upper surface of the body part 121, an arm 123 supported on a side surface of the body part 121, a hand 124 provided at a distal end of the arm 123, and an LED bar 142. The arm 123 and the hand 124 are driven by a motor (not shown), and grasp various objects in a controlled posture. FIG. 1 shows a state where the moving robot 100 grasps a container as an example of an object to be conveyed. The body part 121 can rotate around the vertical axis with respect to the carriage unit 110 by a driving force of the motor (not shown). Accordingly, the moving robot 100 can also move in a predetermined direction while maintaining a posture in which the grasping unit grasps an object to be conveyed and faces a specific direction.

The LED bar 142 is a light emitting device including a plurality of LEDs and light guide materials, and the LEDs are disposed on an annular outer peripheral part of the upper part of the body part 121 so that each of the LEDs emits light in the radial directions with respect to the vertical axis. The LED bar 142 can change a light emitting color and a blinking cycle, and this changing pattern makes it possible to present information on an operation state and a task of the moving robot 100 to surroundings. Further, a control unit 190 is provided in the body part 121. The control unit 190 includes a control unit, a memory and the like, which will be described later.

The head part 122 mainly includes a stereo camera 131 and a display panel 141. The stereo camera 131 has a configuration in which two camera units having the same angle of view are disposed apart from each other, and it outputs images photographed by each of the camera units as image data.

The display panel 141 is, for example, a liquid-crystal panel, and displays a face of a character by illustration, or presents information on the moving robot 100 by using texts and icons. When the display panel 141 displays a face of a character, the impression that the display panel 141 is a dummy face can be given to surrounding observers. Further, the display panel 141 includes a touch panel on the display surface and can receive an input instruction from a user.

The head part 122 can rotate around the vertical axis with respect to the body part 121 by a driving force of the motor (not shown). Accordingly, the stereo camera 131 can photograph a target object present in a predetermined direction, and the display panel 141 can present a display content toward a predetermined direction. Note that in the following description, as shown in the drawings, a moving plane where the moving robot 100 moves is defined as an xy plane, and a vertical axis direction with respect to the moving plane is defined as a z-axis.

Figure 2:
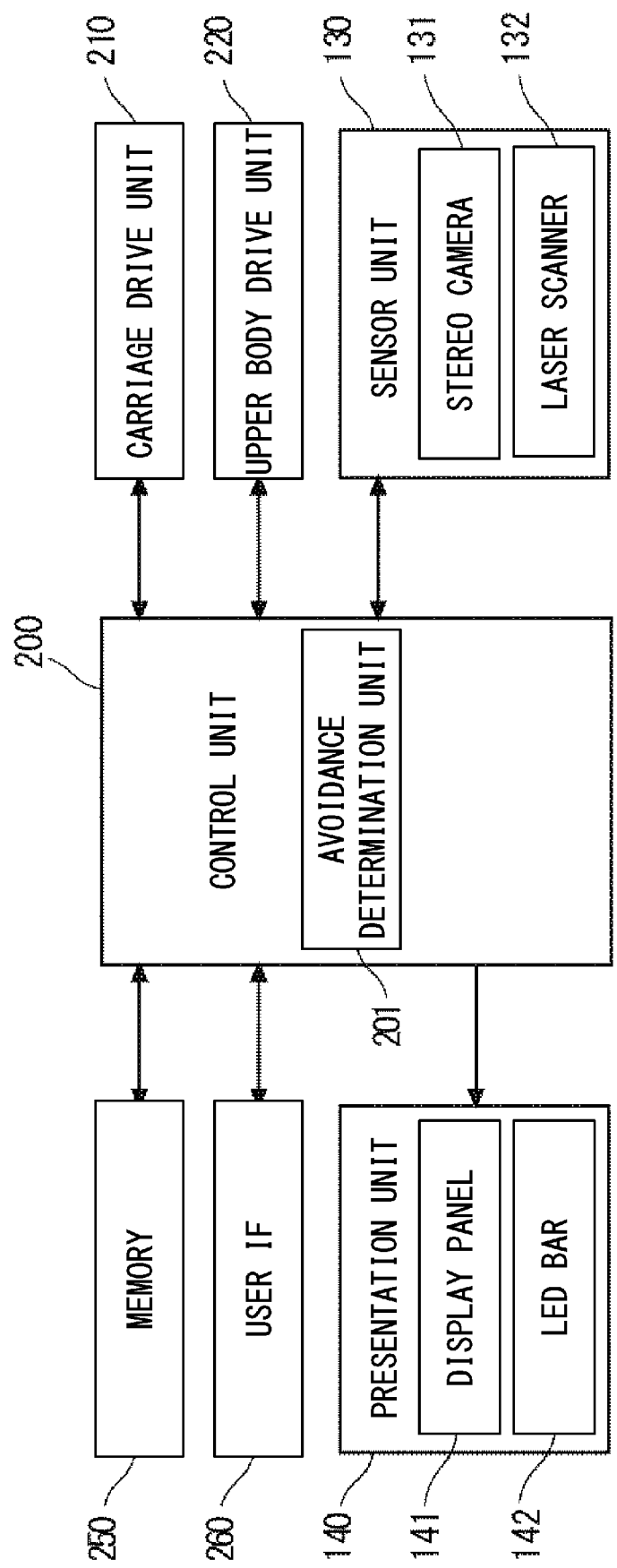
FIG. 2 is a control block diagram of the moving robot.

FIG. 2 is a control block diagram of the moving robot 100. A control unit 200, for example, is a CPU, and is housed in the control unit 190 of the main unit 120. A carriage drive unit 210 includes a drive circuit and a motor for driving the drive wheels 111. The control unit 200 sends a drive signal to the carriage drive unit 210 to control a rotation of the drive wheels 111. Further, the control unit 200 receives a feedback signal of an encoder or the like from the carriage drive unit 210, and recognizes a moving direction of the carriage. The carriage drive unit 210 functions as a movement control unit by cooperating with the control unit 200.

An upper body drive unit 220 includes a drive circuit and a motor for driving a grasping unit including an arm 123 and a hand 124, the body part 121, and the head part 122. The control unit 200 sends a drive signal to the upper body drive unit 220 to control grasping, and a rotation of the body part 121 and the head part 122. Further, the control unit 200 receives a feedback signal of an encoder or the like from the upper body drive unit 220, and recognizes a state of the grasping unit and directions of the body part 121 and the head part 122.

A sensor unit 130 includes various sensors for detecting, for example, another moving robot, an obstacle, a person present in the surrounding area, and a grasped object to be conveyed, and is disposed in the carriage unit 110 and the main unit 120 in a distributed manner. The stereo camera 131 and the laser scanner 132 are components constituting the sensor unit 130. The control unit 200 sends a control signal to the sensor unit 130 to drive various sensors, and then obtains output signals and output data from them. The control unit 200 analyzes these output signals and output data to recognize another moving robot 100, the operation state thereof, and the like. That is, the sensor unit 130 functions as an external sensor for recognizing another autonomous moving body, the operation state thereof, and the like by cooperating with the control unit 200.

A memory 250 is a nonvolatile storage medium, and for example, a solid state drive is used. The memory 250 stores various parameter values, functions, lookup tables, comparative image data and the like which are used for controlling the moving robot 100 in addition to a control program. The memory 250 may store an environmental map representing an environment in which the moving robot 100 moves autonomously.

A user IF 260 is an input unit for the user to input instructions for the moving robot 100. A touch panel superimposed on the display panel 141 is a part of the input unit. Further, not only a physical switch but also a voice input using a microphone, a gesture input using the stereo camera 131, and the like may be incorporated as the user IF 260.

A presentation unit 140 directly or indirectly presents information on the operation state and the task of the moving robot 100 to the surroundings such as a user, a person present in the surrounding area, and another moving robot, and is disposed in the carriage unit 110 and the main unit 120 in a distributed manner. The display panel 141 and the LED bar 142 are components constituting the presentation unit 140. The presentation unit 140 may also include a speaker, an oscillator, and the like. The control unit 200 operates each of the components by sending a control signal to the presentation unit 140.

The control unit 200 also functions as a function calculation unit that executes various calculations related to the control. The avoidance determination unit 201 determines whether to avoid another autonomous moving body when it predicts that there is a possibility that the another autonomous moving body recognized by the external sensor and the own autonomous body may come into contact with each other as they approach each other. The specific determination method will be described in detail later.

In recent years, there has been a growing demand that a plurality of moving robots be autonomously moved to simultaneously execute various tasks in parallel. For example, in a case where a plurality of moving robots are made to respectively execute tasks different from each other under a controlled environment such as a factory, a system can be constructed, by installing a server for comprehensively managing these moving robots, so that the server controls a movement of each of the moving robots and an execution of the tasks. Even when a comprehensive management is not performed by a server, in a managed environment where people who stay with moving robots are restricted, it is possible to use only moving robots that can communicate with each other by using communication means in conformity with a common format. In this case, the moving robots communicate with each other by using communication means so that they can adjust a moving path and a task execution with each other.

However, the environments in which it is desirable that a plurality of moving robots execute different tasks are expanding year by year. Examples of the environment include an airport, a shopping mall, and a theme park. In such an environment where many people gather, there are various tasks required for the moving robot, which makes it difficult to cover all of these tasks with only a moving robot managed by a single system. Further, not only it is difficult but also it is not found rational to, for example managing a moving robot that conveys packages and a moving robot that performs cleaning by a single system. Thus, a moving robot that smoothly executes a given task without interfering with another moving robot, even without belonging to a group bundled by a single system or common communication means. The moving robot 100 according to this embodiment meets to such a demand.

As described above, the moving robot 100 includes no communication device for communicating with other moving robots. Further, it also includes no communication device for receiving an instruction from a server which comprehensively manages a plurality of moving robots. In such a moving robot 100, when there is a possibility that another autonomous moving body and the own moving robot may come into contact with each other after approaching each other, one of important points is to consider how to avoid the contact in order to execute a given task smoothly and steadily. The operation of the moving robot 100 in such a case is described using a specific example.

Figure 3:
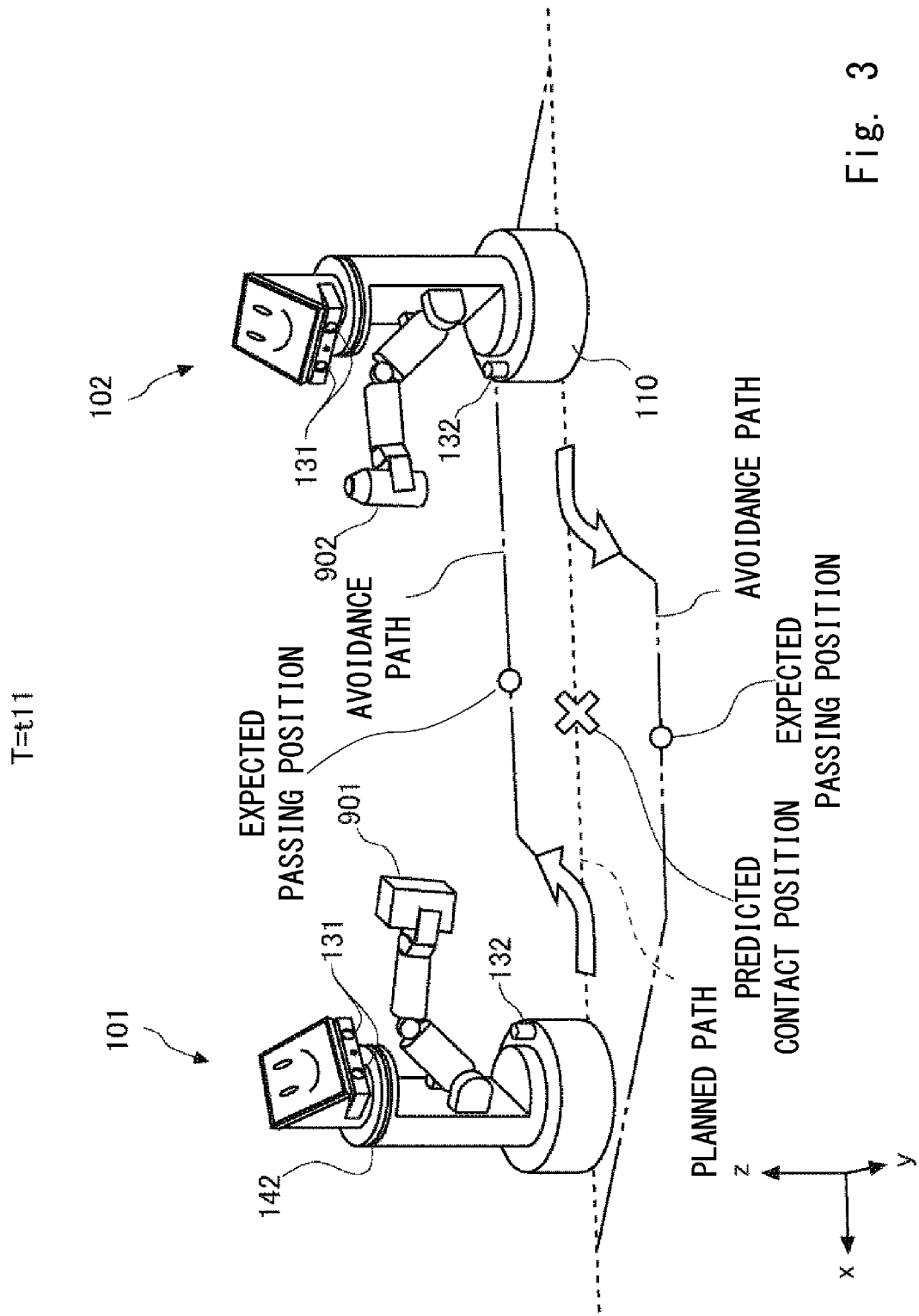
FIG. 3 is a diagram for explaining a situation of avoidance determination in a first example.

FIG. 3 is a diagram for explaining a state of avoidance determination in a first example. Suppose that the moving robot 101 is another autonomous moving body to which a task of conveying an object to be conveyed 901 is given, and has the same configuration as that of the above-described moving robot 100. Further, the moving robot 102 is the own moving robot to which a task of conveying an object to be conveyed 902 is given, and has the same configuration as that of the above-described moving robot 100. The moving robot 101 and the moving robot 102 independently execute the respective tasks and do not communicate with each other using the communication means.

FIG. 3 shows a state of the moving robot at a time T=t11. The moving robot 102, which is the own moving robot, is moving in an x-axis positive direction. On the other hand, the moving robot 101, which is the another autonomous moving body, is moving in an x-axis negative direction on the same line as the line on which the moving robot 102 moves and is approaching to the moving robot 102 to which the moving robot 101 is facing. In other words, the moving path planned by the moving robot 101 and the moving path planned by the moving robot 102 accidentally overlap each other, and the moving robot 101 and the moving robot 102 are to come into contact with each other at a predicted contact position shown in the drawing.

The moving robot 102, which is the own moving robot, autonomously moves while observing an outside situation by using the stereo camera 131 and the laser scanner 132. When the control unit 200 recognizes, during the own moving robot moves autonomously, the moving robot 101 moving autonomously in the forward direction by performing an image analysis of an image captured by the stereo camera 131, the control unit 200 subsequently checks an operation state of the moving robot 101. The operation states to be checked are set as a plurality of items in advance, and the control unit 200 checks the operation state of the moving robot 101 by using an output of the sensor unit 130. The control unit 200 firstly checks a moving direction and a speed of the moving robot 101 as one of the operation states to be checked.

The control unit 200 successively acquires image data from the stereo camera 131 to calculate the moving direction of the moving robot 101 and its speed from a difference among the image data. Alternatively, the control unit 200 may continuously acquire the output of the laser scanner 132 to calculate the moving direction of the moving robot 101 and its speed. The control unit 200 may select which of the sensors is used to calculate the moving direction and the speed of the moving robot 101 based on the recognized shape and color of the moving robot 101.

Further, the control unit 200 calculates the distance between the another autonomous moving body and the own moving robot from the shape, the posture, depth information, and so on of the another autonomous moving body and the own moving robot included in the image data obtained from the stereo camera 131. Note that the control unit 200 may use the output of the laser scanner 132 in place of the output of the stereo camera 131 or in addition to the output of the stereo camera 131.

The control unit 200 calculates the moving direction of the moving robot 101 and the speed thereof and then calculates the distance between the moving robots 101 and 102 to predict whether there is a possibility that the moving robot 101 and the moving robot 102 may come into contact with each other in the future. The case in which the moving robots 101 and 102 may come into contact with each other is not limited to the case in which the moving robots 101 and 102 will definitely come into contact with each other but also includes the case in which, at least when assuming that the own moving robot proceeds the planned path without a change, a part of the moving robot 101 and a part of the moving robot 102 approach closer to each other than a distance set in advance.

When the control unit 200 recognizes that there is a possibility that the another autonomous moving body (the moving robot 101) and the own moving robot (the moving robot 102) come into contact with each other as they approach each other, the avoidance determination unit 201 then determines whether to avoid the moving robot 101.

The avoidance determination unit 201 determines whether to avoid the moving robot 101 based on the checked operation state of the moving robot 101. For example, when the avoidance determination unit 201 determines to perform an avoidance operation and also recognizes that the another autonomous moving body (the moving robot 101) is of the same type as that of the own autonomous moving body (the moving robot 102), it determines to perform the avoidance operation according to a preset avoidance rule. The preset avoidance rule is, for example, to generate an avoidance path on the left side of the planned path when the own moving robot passes a moving robot of the same type as that of the own moving robot under preset conditions and then to pass the moving robot of the same type as that of the own moving robot. In other words, the moving robots 101 and 102 pass through the right side of the other one of the moving robots in accordance with the avoidance rule preset commonly to the moving robots of the same type.

An example of the case in which the moving robots 101 and 102 pass each other will be described with reference to the drawings in detail. As shown in the drawing, the planned paths of the moving robots 101 and 102, which are moving robots of the same type, overlap and the moving robots 101 and 102 are approaching each other. Therefore, each of the moving robots 101 and 102 generates the avoidance path on the left side of the planned path. That is, the avoidance path deviates to the left side of the planned path before the predicted contact position, proceeds a preset distance, and then turns right to proceed parallel to the planned path. Then, when the moving robots 101 and 102 pass by a position where they plan to pass each other, they gradually approach their planned paths and joins them.

The moving robot of the same type as that of the own moving robot performs the avoidance operation in accordance with the common avoidance rule to thereby prevent the avoidance paths from overlapping and enable an efficient avoidance path to be selected. Then, the autonomous moving body can efficiently execute a given task. It is obvious that the preset avoidance rule may define that the avoidance path is generated on the right side of the planned path instead of left side of the planned path. Further, the preset avoidance rule may also define the speed at which the moving robots pass each other. Alternatively, if it is predicted that the left side of the own autonomous moving body comes into contact with the another autonomous moving body from the relative positional relationship between the another autonomous moving body recognized by the external sensor and the own autonomous moving body, the avoidance path may be generated so that the planned path of the own autonomous body deviates to the right of the planned path.

In this way, the avoidance determination unit 201 generates the avoidance path in such a way that the moving robot 102 robot passes the moving robot 101 at an expected passing position. When the avoidance determination unit 201 determines that the avoidance path is successfully generated and to execute the avoidance operation, the control unit 200 controls the carriage drive unit 210 in such a way that the own moving robot moves along the avoidance path.

Figure 4:
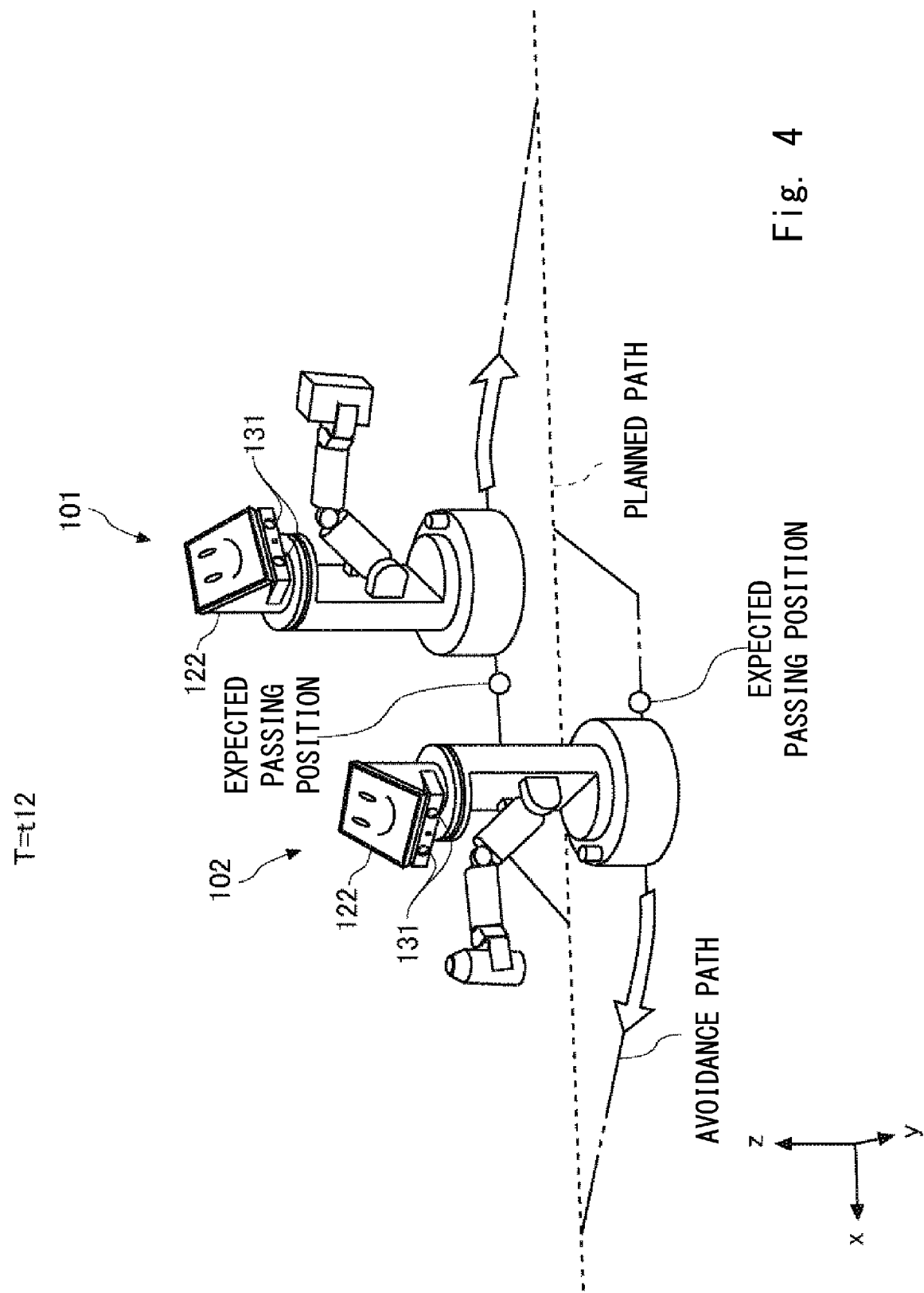
FIG. 4 is a diagram for explaining a situation during a passing operation in the first example.

FIG. 4 is a diagram for explaining a state during the avoidance operation. FIG. 4 shows the state of the moving robot at a time T=t12 after the time T=t11. As shown in the drawing, each of the moving robots 101 and 102 generates the avoidance path on the left side of the planned path in accordance with the common avoidance rule, and performs the avoidance operation along this path. Then, the moving robots 101 and 102 proceed in such a way that after they pass each other at the expected passing position, they return to their planned paths.

Note that the control unit 200 continues to obtain the output of the sensor unit 130 even during the avoidance operation. At this time, the control unit 200 may rotate the head part 122 and obtain the image data of the moving robot 101 with the stereo camera 131 to recognize that passing has been succeeded.

When the moving robot 102 generates the avoidance path on the left side of the planned path and performs the avoidance operation along this path, the moving robot 101 that is supposed to be of the same type as that of the own moving robot may not execute the expected avoidance operation in some cases. That is, the avoidance determination unit 201 may again predicts that there is a possibility that the moving robot 102 may come into contact with the another autonomous moving body as a result of recognizing the operation state of the moving robot 101 recognized by the external sensor after the movement is started along the planned avoidance path in accordance with the avoidance rule. In such a case, the avoidance determination unit 201 determines whether to further avoid the another autonomous moving body. Specifically, when the moving robot 101 is approaching after the moving robot 102 starts moving along the avoidance path, the avoidance determination unit 201 recognizes the operation state of the moving robot 101 and then executes an operation of avoiding the moving robot 101.

While the avoidance determination unit 201 determines to perform the avoidance operation as described above, the avoidance determination unit 201 may determine not to perform the avoidance operation considering that the checked moving robot 101 is in the operation state shown below in some cases.

An example of such a case is a case when it is recognized that the LED bar 142 of the moving robot 101 emits light with a light-emitting pattern indicating that the moving robot 101 moves to avoid the moving robot 102. Alternatively, the display panel 141 of the moving robot 101 may indicate that the moving robot 101 moves to avoid the moving robot 102. Each of the moving robots 101 and 102, which are autonomous moving bodies of the same type, stores the preset light-emitting pattern of the LED bar 142 or the preset display pattern of display panel 141. Accordingly, the moving robot 102 recognizes such an operation state presented by the moving robot 101 and determines not to perform the avoidance operation.

Further, in the operation state of the moving robot 101, when there is no longer the possibility that the moving robots 101 and 102 come into contact with each other by performing the operation of avoiding the moving robot 102, the avoidance determination unit 201 may determine not to perform the avoidance operation. When the moving robot 102 determines whether to avoid the contact with the moving robot 101, it recognizes the operation state of the moving robot 101 for a preset period. Therefore, when the moving direction and the speed of the moving robot 101 change within that period, the avoidance determination unit 201 can make such a determination. In this manner, when the own autonomous moving body determines not to perform the avoidance operation if it is obvious that the another autonomous moving body avoids the own autonomous moving body, it is possible to effectively prevent the avoidance path of the moving robot 102 from overlapping the avoidance path of the moving robot 101.

As described above, the example described with reference to FIGS. 3 and 4 is about a case where the autonomous moving bodies of the same type pass each other. When there is a possibility that the moving robot 102 comes into contact with a moving body of a type different from that of the moving robot 102, the moving robot 102 can control the carriage drive unit 210 so that it will not come into contact with the moving body of the type different from that of the moving robot 102 based on outputs of the stereo camera 131 and the laser scanner 132 obtained from the sensor unit 130. For example, when the moving robot 102 approaches a moving body of a type different from that of the moving robot 102 to within a predetermined distance or closer, the moving robot 102 deviates to the left of the planned path and proceeds if it predicts that it may come into contact with the moving body of the type different from that of the moving robot 102 at the right side of the moving robot 102, whereas the moving robot 102 deviates to the right of the planned path and proceeds if it predicts that it may come into contact with the moving body of the type different from that of the moving robot 102 at the left side of the moving robot 102. Further, the moving robot 102 may reduce the speed if it predicts that the moving robot of the type different from that of the moving robot 102 may come into contact with a front part of the moving robot 102, whereas the moving robot 102 may increase the speed if it predicts that the moving robot of the type different from that of the moving robot 102 may come into contact with a rear part of the moving robot 102. Alternatively, the moving robot 102 may stop until there is no longer the possibility that the moving body of the type different from that of the moving robot 102 may proceed on the planned path.

The control unit 200 may control the display panel 141 to display icons and letters indicating that the avoidance operation is in progress. Further, the control unit 200 may send a control signal to the upper body drive unit 220 to rotate the head part 122 so that surrounding persons and moving robot can easily recognize the avoidance operation. Further, the control unit 200 may control the LED bar 142 to emit light with a light-emitting pattern indicating that the avoidance operation is in progress.

By such a presentation by the moving robot 102, the moving robot 101 to be avoided can recognize that it is avoided as long as it is a moving robot of the same type as that of the moving robot 102 even when neither of them includes communication devices for communication. That is, it is possible to recognize the avoidance operation of the moving robot 102 by capturing a display on the display panel 141 and the light-emitting pattern of the LED bar 142 of the moving robot 102 using the stereo camera 131. The moving robot 102 may perform movement control such as reducing a speed, when recognizing to be avoided.

Figure 5:
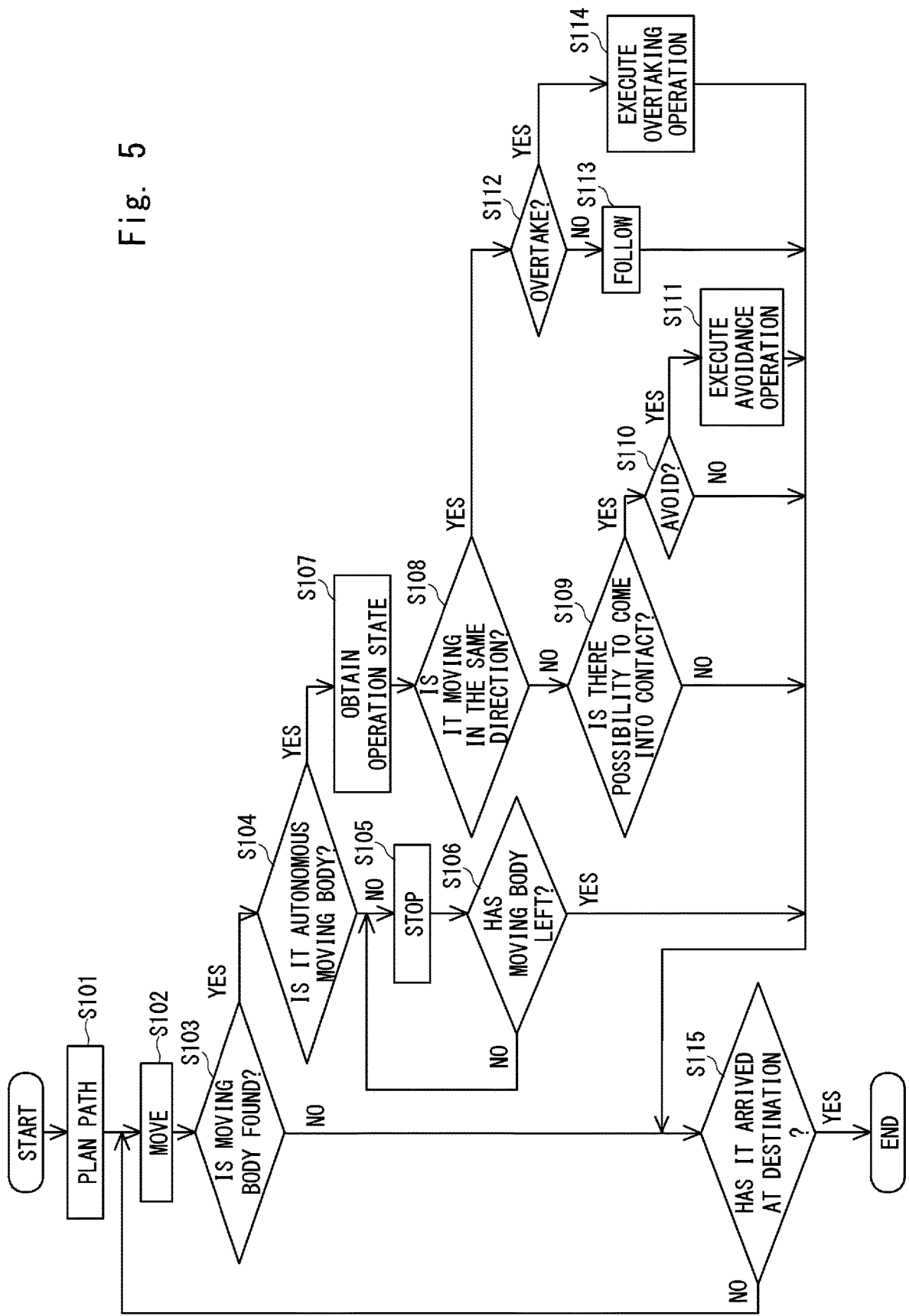
FIG. 5 is a flowchart showing a processing flow related to a movement of the moving robot.

Next, a process flow regarding movement of the moving robot 100 is described. FIG. 5 is a flowchart showing the process flow regarding the movement of the moving robot 100. The flow starts when a task is given and ends with the arrival of the moving robot 100 at the destination.

In Step S101, the control unit 200 plans a moving path necessary for executing a task. The planning of the moving path is performed by, for example, referring to an environmental map stored in the memory 250. For example, a conveyance destination of a task for conveying an object to be conveyed is specified by the user, and thus the control unit 200 plans the moving path from the current location to the conveyance destination with reference to the environmental map. The current location is recognized, for example, by an output of a GPS unit mounted as the sensor unit 130.

In Step S102, the control unit 200 controls the carriage drive unit 210 in such a way that the own moving robot moves along the planned moving path. The control unit 200 continuously acquires an output signal and output data from the sensor unit 130 during the movement of the own moving robot to monitor whether there is an obstacle or an approaching moving body. When an obstacle is found, the control unit 200 generates an avoidance path to avoid the obstacle. The control unit 200 checks whether a moving body is approaching in Step S103, and if no moving body is approaching, the process proceeds to Step S115. If a moving body is approaching, the process proceeds to Step S104.

In Step S104, the control unit 200 determines whether the found moving body is an autonomous moving body. If the control unit 200 determines that the found moving body is not an autonomous moving body, it stops the movement of the own moving robot in Step S105 and avoids the found moving body in order to give a priority to a movement of the found target including the case where the target is a person. Then, the own moving robot waits while maintaining itself at a standstill until it is possible to determine in Step S106 that the target moving body has left. When it is possible to determine that the moving body has left, the process proceeds to Step S115. The operation of maintaining standstill and waiting is shown as an example of avoiding a moving body which is not an autonomous moving body. Alternatively, the control unit 200 may determine to perform other avoidance operations such as reducing the speed of the moving robot 100 and moving on a condition that the moving body 100 will not approach the moving body which is not an autonomous moving body to within a predetermined distance or closer.

When the control unit 200 determines in Step S104 that the found moving body is an autonomous moving body, the process proceeds to Step S107 where the control unit 200 checks the operation state of the autonomous moving body. The control unit 200 determines whether the found autonomous moving body is moving in the same direction as the direction in which the own autonomous moving body is moving in Step S108 from a result of checking the operation state. When the control unit 200 determines that the found autonomous moving body is not moving in the same direction as the direction in which the own autonomous moving body is moving, the process proceeds to Step S109.

In Step S109, the control unit 200 calculates the possibility that the own autonomous moving body may come into contact with the found autonomous moving body. As a result of the calculation, when the control unit 200 determines that there is a possibility that the own autonomous moving body may come into contact with the found moving body, the process proceeds to Step S110. Alternatively, when the control unit 200 determines in Step S109 that there is no possibility that the own autonomous moving body comes into contact with the found autonomous moving body, the process proceeds to Step S115.

In Step S110, the avoidance determination unit 201 determines whether to avoid the found autonomous moving body. When it is obvious that the found autonomous moving body avoids the own autonomous moving body, the avoidance determination unit 201 determines not to perform the avoidance operation. In this case, the avoidance determination unit 201 proceeds to Step S115. On the other hand, when the avoidance determination unit 201 determines to perform the avoidance operation, the process proceeds to Step S111. As described with reference to FIG. 3, the avoidance determination unit 201 executes the operation of avoiding the found autonomous moving body in Step S111. Then, when the avoidance operation is completed, the process proceeds to Step S115.

When the control unit 200 determines in Step S108 that the found autonomous moving body is moving in the same direction as the direction in which the own autonomous moving body is moving, the process proceeds to Step S112. The control unit 200 determines in Step S112 whether to overtake the found autonomous moving body. When the control unit 200 determines not to perform an overtaking operation, the process proceeds to Step S113 where the own autonomous moving body follows the found autonomous moving body, and the process proceeds to Step S115. Then the control unit 200 determines to perform the overtaking operation, the process proceeds to Step S114 where the overtaking operation is executed, and then the process proceeds to Step S115.

The control unit 200 checks whether the own autonomous moving body has arrived at the destination in Step S115. When the own autonomous moving body has not arrived at the destination, the process returns to Step S102 to continue the movement control. When the own autonomous moving body has arrived at the destination, a series of the movement control ends. The avoidance operation in Step S111 can employ various avoidance operations in addition to the operation described with reference to FIG. 3. Thus, more examples of the avoidance operation will be explained.

Figure 6:
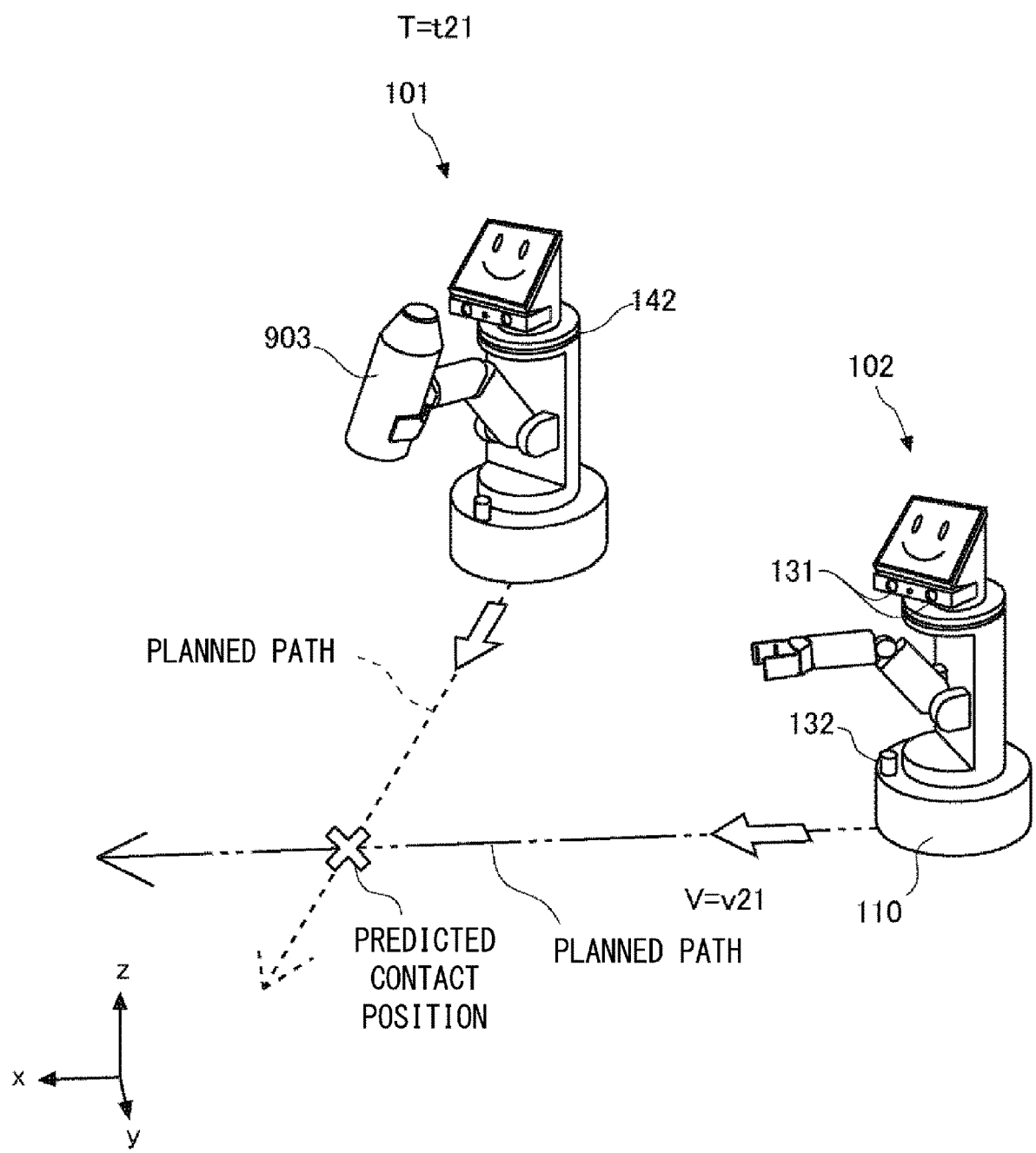
FIG. 6 is a diagram for explaining a situation of avoidance determination in a second example.

An example of the avoidance operation by the own autonomous moving body recognizing a moving direction and a speed of the another autonomous moving body will be described with reference to FIGS. 6 and 7. FIG. 6 is a diagram for explaining a state of the avoidance determination in a second example. The state shown in FIG. 6 differs from the state of FIG. 3 in that, in FIG. 6, the planned paths of the two moving robots intersect with each other. FIG. 6 shows the state of the moving robots 101 and 102 at the time T=t21. The moving robot 101 is the another autonomous moving body to which a task of conveying an object to be conveyed 903 is given. The moving robot 102 is the own moving robot to which a task of proceeding to a predetermined destination without grasping an object to be conveyed is given. In the drawing, the moving robot 102 proceeds in the x-axis positive direction, and the moving robot 101 proceeds to intersect the planned path of the moving robot 102 from the y-axis negative side to the y-axis positive direction. At this time, the moving robot 101, which is the another autonomous moving body, and the moving robot 102, which is the own autonomous moving body, are about to almost simultaneously reach a point (a predicted contact position) at which the moving paths intersect with each other. Thus, there is a possibility that the two autonomous moving bodies may come into contact with each other.

In such a state, when the control unit 200 determines in Step S109 that there is a possibility that the moving robot 102 may come into contact with the moving robot 101, the avoidance determination unit 201 determines whether to avoid the moving robot 101. Here, the avoidance determination unit 201 recognizes the operation state of the moving robot 101 based on appearance information obtained from the sensor unit 130. Then, the avoidance determination unit 201 calculates the moving direction of the moving robot 101, the speed thereof, and an expected arrival time to reach the predicted contact position, and also calculates the expected arrival time to reach the predicted contact position from the moving direction of the moving robot 102 and the speed thereof. Further, the avoidance determination unit 201 calculates which one of the moving robots reaches the predicted contact position first. When the own autonomous moving body first reaches the predicted contact position, and the speed thereof can be increased, the avoidance determination unit 201 determines to avoid the moving robot 101 by increasing the speed of the own autonomous moving body. On the other hand, even when the own autonomous moving body first reaches the predicted contact position, if the speed thereof cannot be increased or the another autonomous moving body (the moving robot 101) first reaches the predicted contact position, the avoidance determination unit 201 determines to avoid the moving robot 101 by reducing the speed of the own autonomous moving body.

Figure 7:
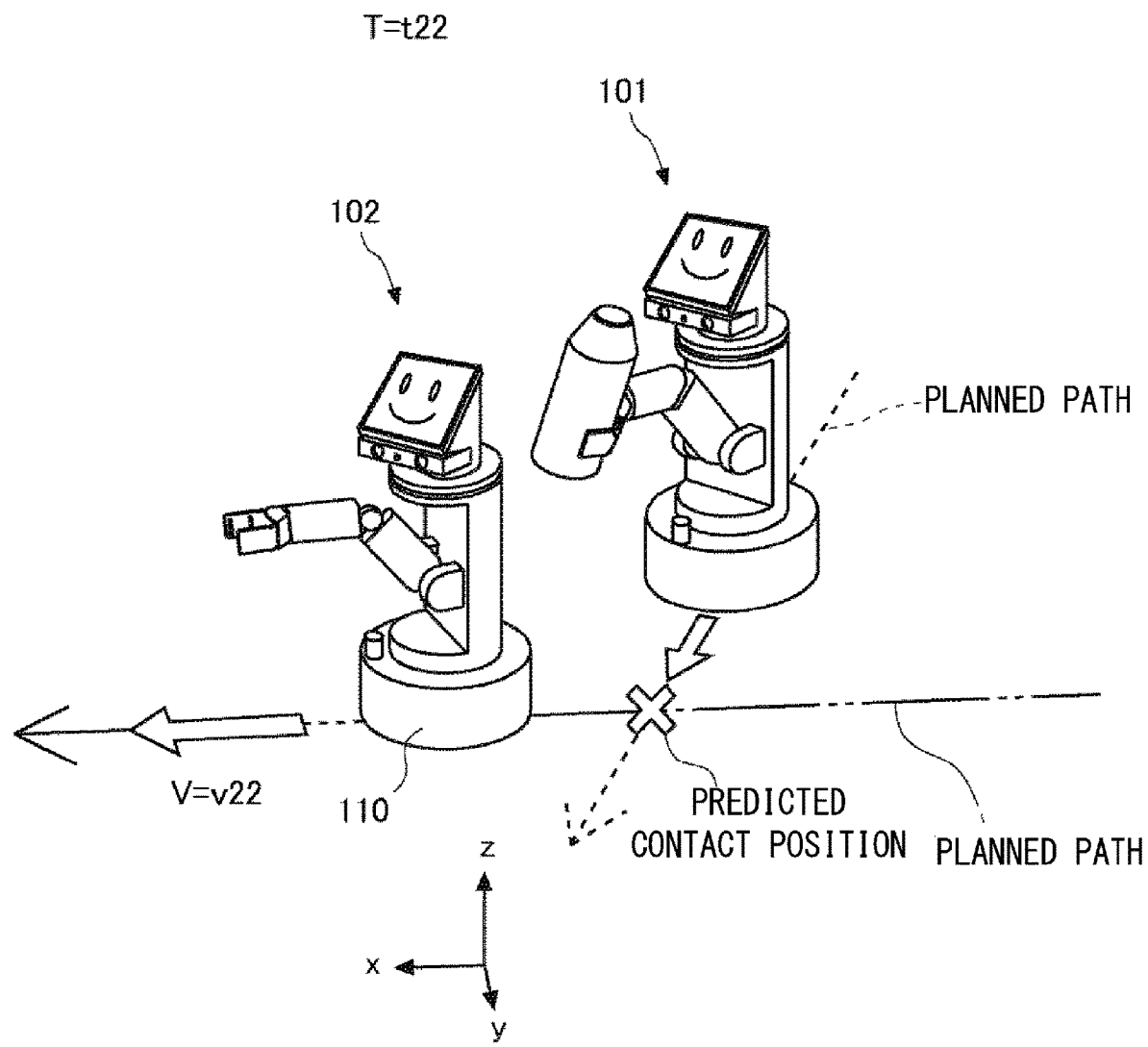
FIG. 7 is a diagram for explaining a situation during a passing operation in the second example.

FIG. 7 is a diagram for explaining a state of the passing operation in progress in the second example. In FIG. 6, the moving robot 102 having the speed of V=v21 proceeds on the planned path while changing the speed V to v22, which is faster than v21, at a time T=t22 after a time T=t21. By the increased speed of the moving robot 102, the moving robot 102 succeeds in avoiding the moving robot 101.

Figure 8:
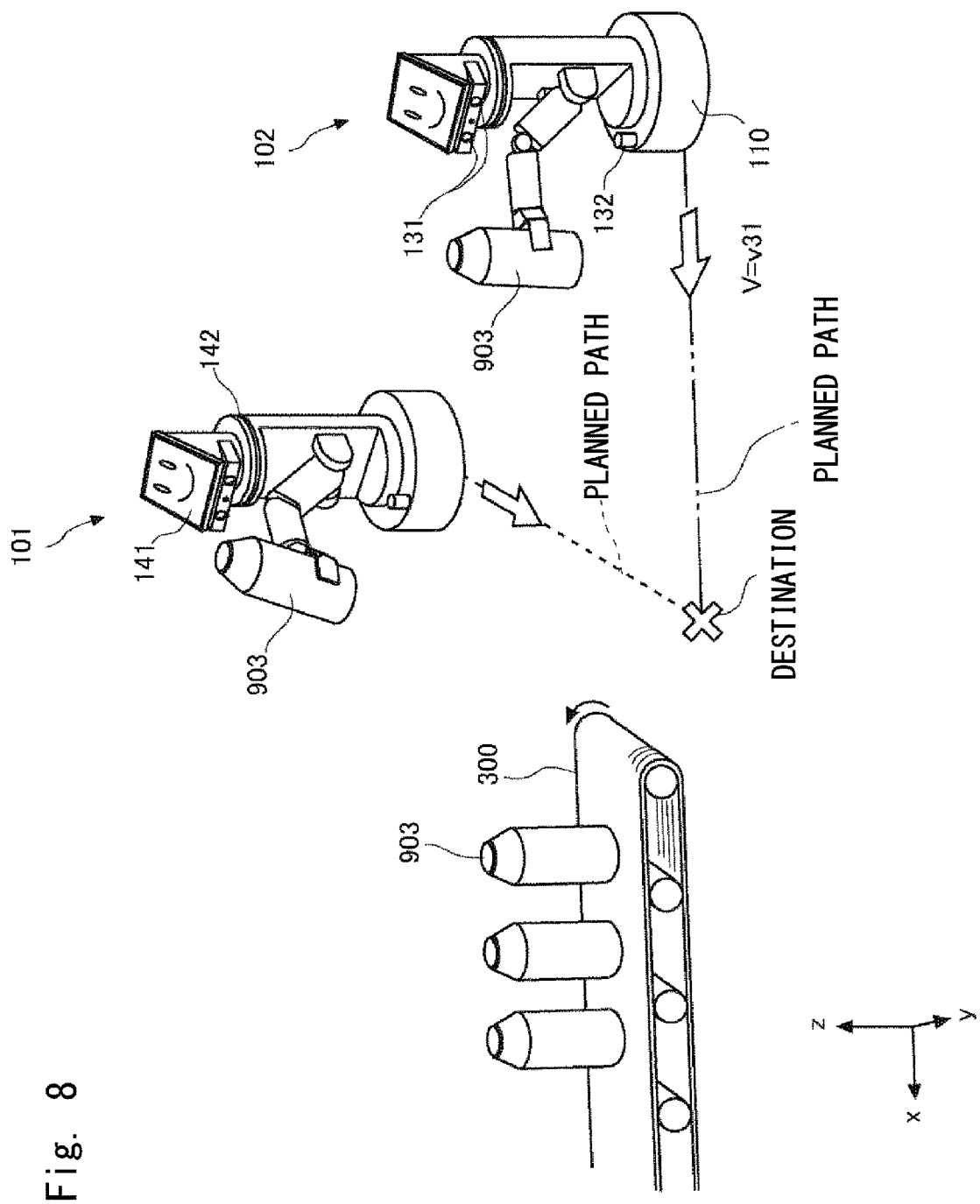
FIG. 8 is a diagram for explaining a situation of avoidance determination in a third example.

Next, an example of the avoidance operation when destinations of two moving robots are the same will be described. FIG. 8 is a diagram for explaining a state of the avoidance determination in a third example. FIG. 8 shows a state of the moving robot 101, which is the another autonomous moving body, and the moving robot 102, which is the own autonomous moving body, at a time T=t31. The moving robot 101 is the another autonomous moving body to which a task of conveying an object to be conveyed 903 and placing it on a conveyor 300 at the destination is given. The moving robot 102 is the own autonomous moving body to which a task of conveying another object to be conveyed 903 and placing it on the conveyor 300 at the destination is given. Here, the moving robots 101 and 102 are moving along different planned paths, and attempting to reach the destination almost simultaneously. Thus, there is a possibility that the two autonomous moving bodies may come into contact with each other.

In such a state, when the control unit 200 determines in Step S109 that there is a possibility that the moving robot 102 may come into contact with the moving robot 101, the avoidance determination unit 201 of the moving robot 102 determines whether to avoid the moving robot 101. In this case, the avoidance determination unit 201 recognizes the operation state of the moving robot 101 by recognizing the appearance information (the display on the display panel 141 and the light-emitting pattern of the LED bar 142) obtained from the sensor unit 130. That is, the avoidance determination unit 201 recognizes the display on the display panel 141 of the moving robot 102 obtained by the sensor unit 130 and the light-emitting pattern of the LED bar 142, and checks whether they coincide with the information on the task stored in the memory 250.

The avoidance determination unit 201 further compares the task of the moving robot 101 with the task of the moving robot 102 and determines whether to avoid the moving robot 101 according to a comparison result. For example, the avoidance determination unit 201 determines whether the light-emitting pattern of the LED bar 142 of the moving robot 101 is executing a task having a higher priority than that of the task of the moving robot 101. The priority of the task is stored in advance in, for example, the memory 250 as a lookup table. The avoidance determination unit 201 refers to this table and checks the priority. The priority is defined by, for example, importance of the task, urgency of the task, the number of tasks given, a remaining amount of a battery of the moving robot, the priority peculiar to the moving robot, and so on.

When the moving robot 101 is executing a task having a higher priority than that of the task of the moving robot 102 as a result of checking the priority, the avoidance determination unit 201 of the moving robot 102 determines to avoid the moving robot 101, and the control unit 200 performs control to reduce a moving speed v31 of the moving robot 101. On the other hand, when the light-emitting pattern of the LED bar 142 of the moving robot 101 does not indicate that a task having a higher priority than that of the task of the moving robot 102 is being executed, the moving robot 102 proceeds on the planned path. Then, for example, when the moving robot 101 stops before the destination, or when the light-emitting pattern of the LED bar 142 of the moving robot 101 presents that the task of the moving robot 102 is to be prioritized, the avoidance determination unit 201 determines not to perform the avoidance operation. Further, for example, when the moving robot 101 is proceeding to the destination without reducing the speed, the avoidance determination unit 201 of the moving robot 102 avoids the moving robot 101. Then, the control unit 200 reduces the moving speed of the own autonomous moving body or temporarily stops the own autonomous moving body.

Figure 9:
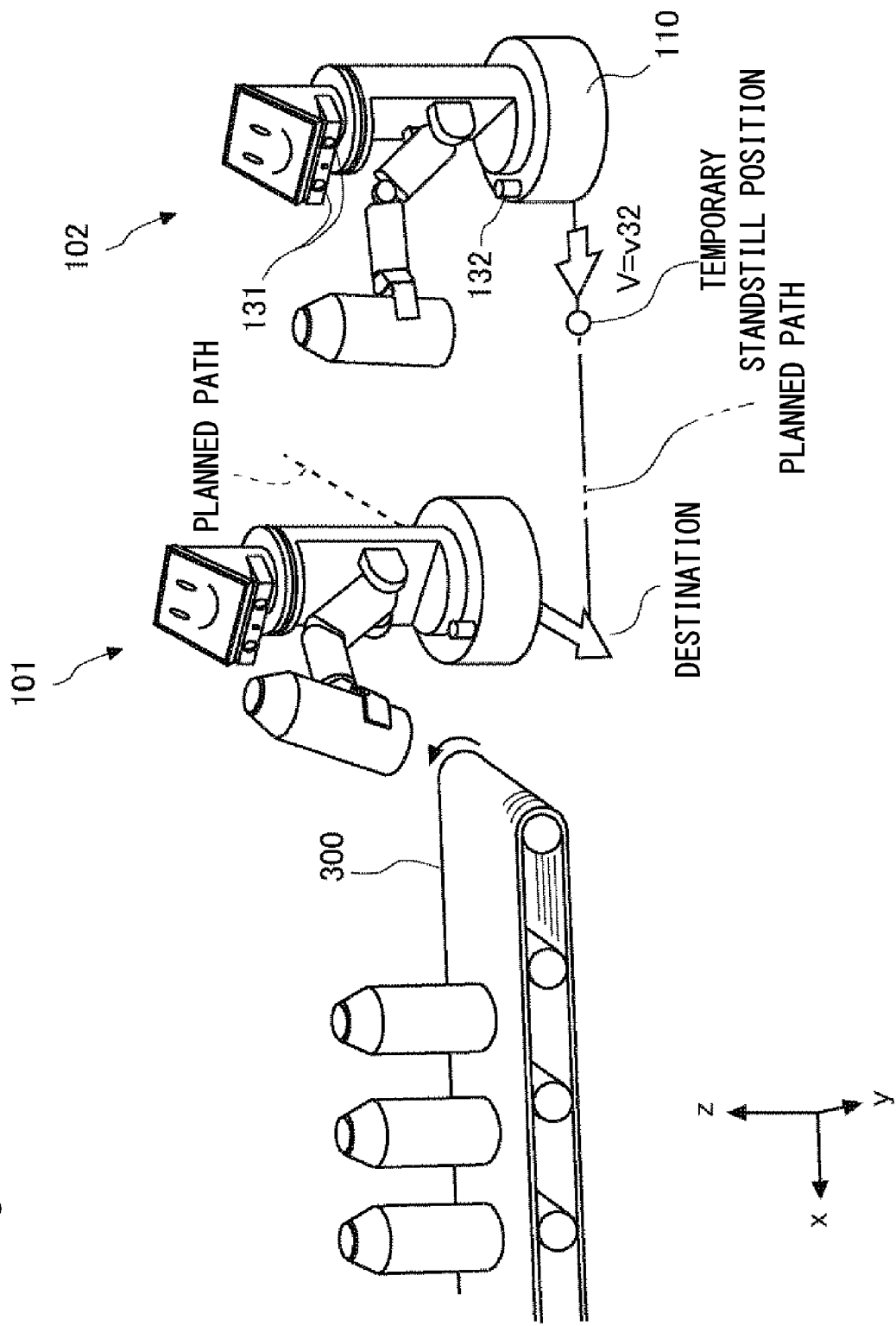
FIG. 9 is a diagram for explaining a situation of a standby operation in a third example.

FIG. 9 is a diagram for explaining a state of a standstill operation in a third example. FIG. 9 shows a state of the moving robot at a time T=t32 after a time T=31. In the drawing, in order to prioritize the task of the moving robot 101, the moving robot 102 reduces the moving speed V from v31 to v32 and further stops at a temporary standstill position to attempt to avoid the moving robot 101. Such a determination enables the moving robot 102 to ensure safety in a state where intercommunication with other autonomous moving bodies is not performed, and to execute a task smoothly. Note that the moving robot 101 may present the priority of the task by displaying it on the display panel 141 instead of displaying it on the LED bar 142.

Figure 10:
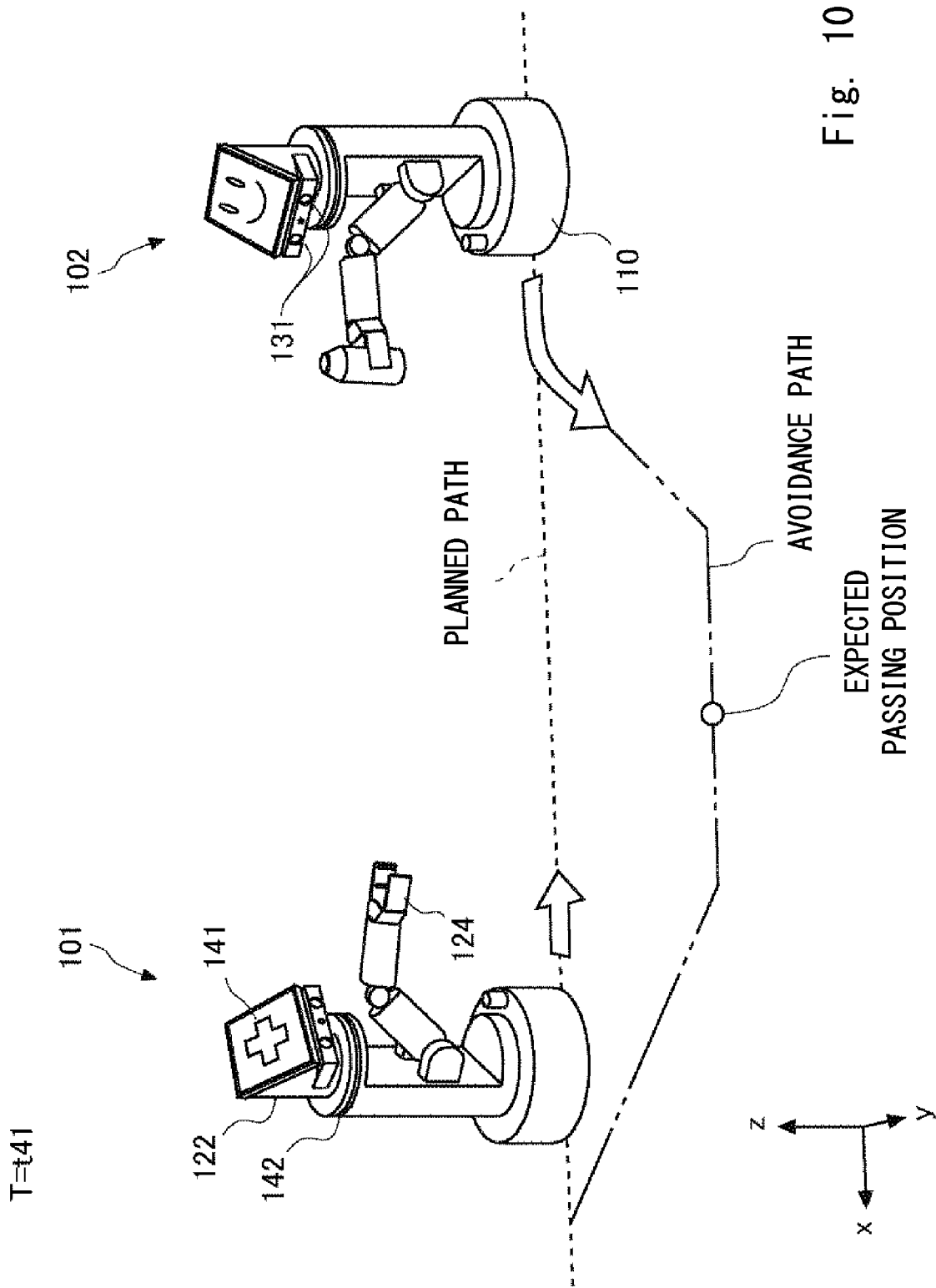
FIG. 10 is a diagram for explaining a situation of avoidance determination in a fourth example.

FIG. 10 is a diagram for explaining a state of the avoidance determination in a fourth example. The state shown in FIG. 10 differs from the state of the first example shown in FIG. 3 in that, in FIG. 10, the moving robot 101, which is the another autonomous moving body, is executing a task with a high priority. FIG. 10 shows a state in which the moving robots 101 and 102 approach each other at a time T=t41, and are proceeding on a path on which the moving robots 101 and 102 are predicted to come into contact with each other.

At a stage where the moving robot 102 checks the operation state of the moving robot 101, the control unit 200 of the moving robot 102 recognizes information on the task executed by the moving robot 101. As shown in the drawing, the moving robot 101 displays an icon indicating a medical emergency on the display panel 141 and emits light with a pattern light indicating a medical emergency by using the LED bar 142 when a given task is a task of a medical emergency, such as bringing life-saving appliances from a predetermined shelf. Further, the moving robot 101 rotates the head part 122.

The control unit 200 of the moving robot 102 which is the own moving robot recognizes the above-described display and emitted light, and thereby recognizing that the moving robot 101 is executing an emergency task. Then, the avoidance determination unit 201 checks that the priority of the emergency task is high as compared with normal conveyance of the object to be conveyed, which is the task of the own autonomous moving body, and determines whether to perform the avoidance operation.

When the avoidance determination unit 201 determines that the moving robot 102 should avoid the moving robot 101, the control unit 200 of the moving robot 102 controls the carriage drive unit 210 of the moving robot 102 so as not to interfere the task of the moving robot 101. That is, the control unit 200 generates the avoidance path to keep the moving robot 102 away from a proceeding path of the moving robot 101 according to the determination of the avoidance determination unit 201. Then, the moving robot 102 passes the moving robot 101 at a position w (the expected passing position) that is distant from the moving robot 101 by a preset distance.

Figure 11:
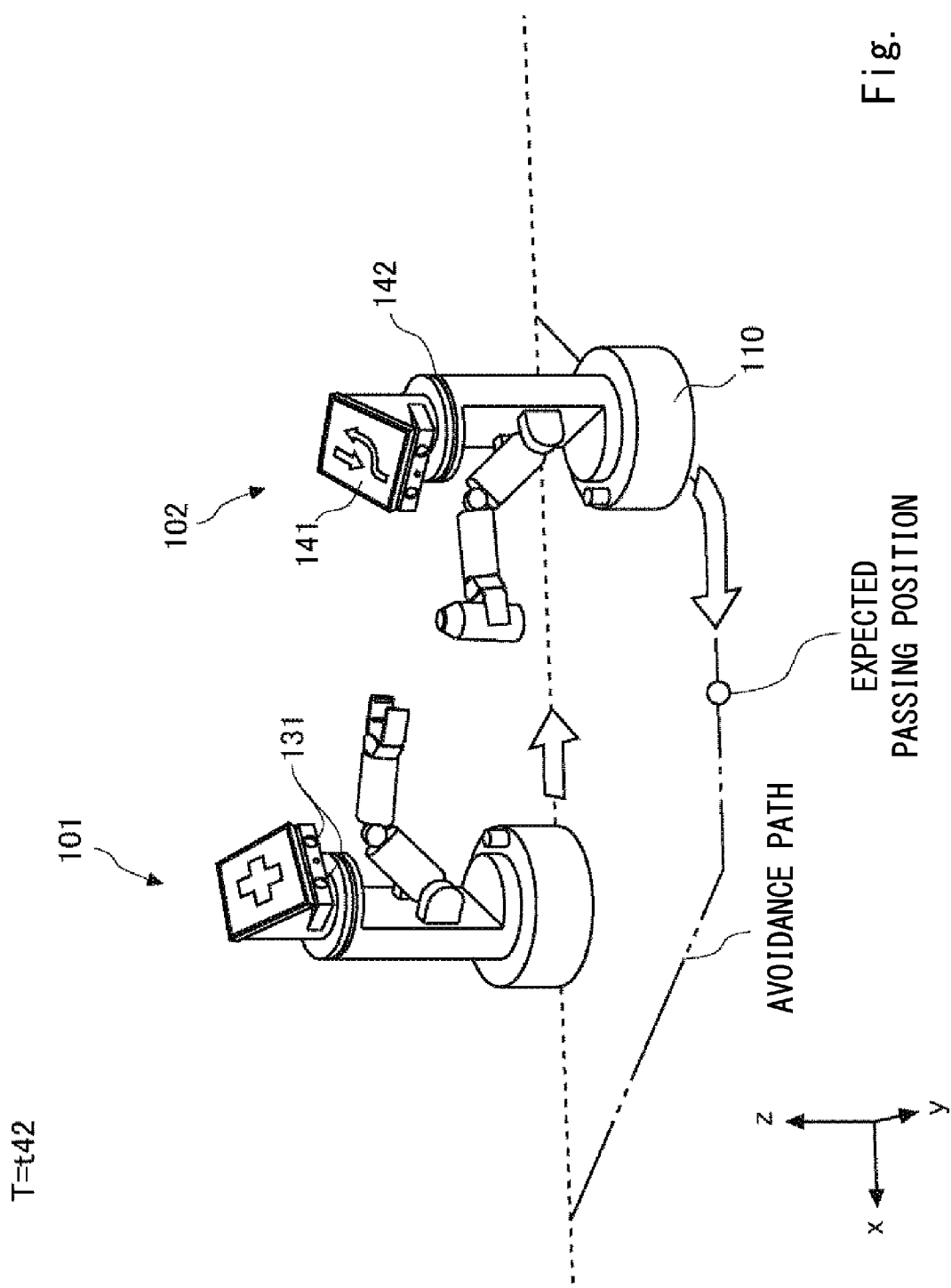
FIG. 11 is a diagram for explaining a situation during a passing operation in the fourth example.

FIG. 11 is a diagram for explaining a state of the passing operation in progress in the fourth example. FIG. 11 shows that the moving robot 102 is proceeding to the expected passing position at a time T=t42 after the time T=t41. As shown in the drawing, the moving robot 102 displays on the display panel 141 that the moving robot 102 performs the avoidance operation and does not interfere the movement of the moving robot 101. Then, the moving robot 101 recognizes that the moving robot 102 is executing the avoidance operation and continues to execute the planned task.

Note that when the task of the own moving robot has a priority higher than that of the moving robot 101, the own moving robot does not perform the avoidance operation and proceeds the planned path as long as other operation states allow. By performing the above determination and movement control, even when no moving robots are controlled under the same system, or even when no moving robots include communication devices for communicating with each other, it is possible for these moving robots to perform a pseudo cooperative operation.

Figure 12:
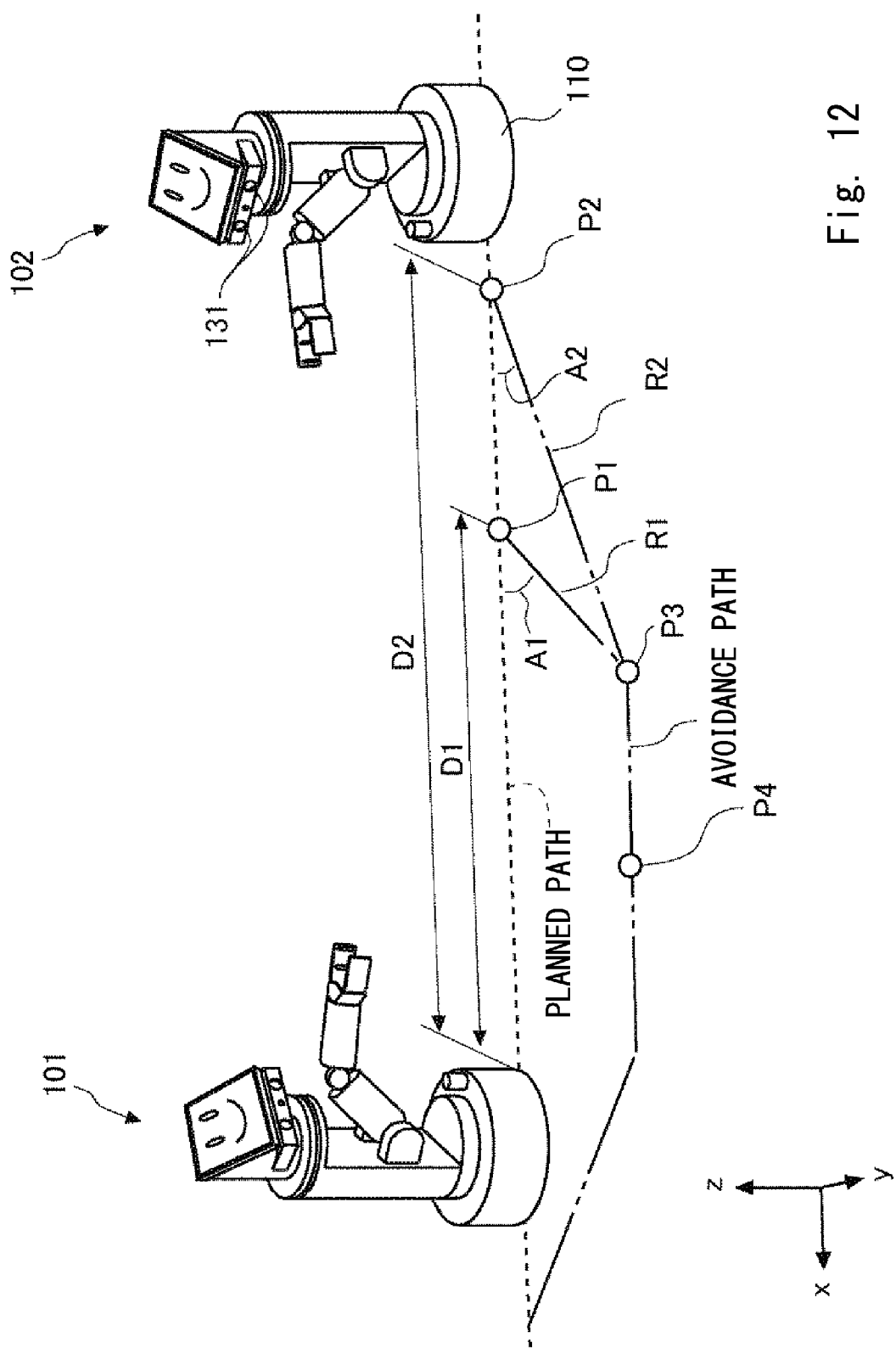
FIG. 12 is a diagram for explaining an avoidance path in a fifth example.

Next, variations of the avoidance path generated by the avoidance determination unit 201 will be described. FIG. 12 is a diagram for explaining an avoidance path in a fifth example. FIG. 12 shows a state where it is predicted that there is a possibility that the moving robot 101, which is the another autonomous moving body, and the moving robot 102, which is the own autonomous moving body, are moving so as to approach each other from a position where they face each other. That is, the avoidance path of FIG. 12 shows a variation of the avoidance path of the moving robot 102 shown in FIG. 3. In such a state, the avoidance determination unit 201 determines whether to avoid the moving robot 101 in Step S110. When the own autonomous moving body avoids the moving robot 101, for example, the control unit 200 generates the avoidance path in which the proceeding path is changed to diagonally left front of the planned path, and controls the carriage unit 110 to proceed along the changed avoidance path. Further, the control unit 200 controls the carriage unit 110 to turn right forward at a position P3 before a position P4, which is the expected passing position, and further pass the moving robot 101 at the position P4.

Here, the control unit 200 sets an angle formed by the planned path and the avoidance path according to a distance between the own autonomous moving body and the another autonomous moving body. For example, when a position P1, which is distant from the moving robot 101 by a distance D1, is a starting position, the control unit 200 sets an angle formed by the planned path and the avoidance path as an angle A1. The avoidance path in this case is referred to as a first avoidance path R1. In the first avoidance path R1, the moving robot 102 turns from the starting position P1 at the angle A1 and proceeds to the position P3.

On the other hand, when a position P2, which is distant from the moving robot 101 by a distance D2 that is farther than the distance D1, is a starting position, the control unit 200 sets an angle formed by the planned path and the avoidance path as an angle A2 that is smaller than the angle A1. The avoidance path in this case is referred to as a second avoidance path R2. In the second avoidance path R2, the moving robot 102 turns from the starting position P2 at the angle A2 and proceeds to the position P3.

That is, the control unit 200 sets the first angle (A1), which is the angle formed by the planned path and the first avoidance path R1 when the distance between the own autonomous moving body and the another autonomous moving body is the first distance (D1) in such a way that it becomes larger than the second angle (A2) formed by the planned path and the second avoided path (R2) when the second distance (D2) is larger than the first distance (D1).

Setting in this way enables the moving robot 102 to generate a more smooth avoidance path and to efficiently avoid other autonomous moving bodies. In the above explanation, in both the first avoidance path and the second avoidance path, the moving robot proceeds to the position P3 and turns right forward at the position P3. However, the first avoidance path and the second avoidance path do not have to match each other at the position P3. In the above example, although the avoidance path is generated to the left front of the planned path, it is obvious that the avoidance path may be generated right front of the planned path.

Although this embodiment has been described above by using the moving robot 100 including no communication device, moving robots which can perform this embodiment are not limited to those including no communication device. For example, a plurality of moving robots belonging to one group of moving robots may respectively adjust movements thereof by communication using a communication device, and may perform the above-described control when recognizing other moving robots which do not belong to any group of moving robots. Alternatively, while intercommunication with other moving robots is established, the movement control may be performed based on a communication result of the intercommunication regardless of a determination of the avoidance determination unit 201, and when the intercommunication is not established, the movement control may be performed based on the determination of the avoidance determination unit 201. When communication with other moving robots is performed through a communication device, a server may be used. In this case, the server may control the communication independently.

A control program which is configured to control the robot can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous moving body that moves along a planned moving path in order to execute a given task, the autonomous moving body comprising:
    an external sensor configured to detect (i) another autonomous moving body to which another task is given and (ii) an operation state thereof;
    a processor programmed to
        predict, using only data received from the external sensor, that there is a possibility that the autonomous moving body and the other autonomous moving body detected by the external sensor may come into contact with each other as they approach each other; and
        make a determination, using only the data received from the external sensor, whether to avoid the other autonomous moving body; and
    a drive circuit configured to control the autonomous moving body based on the determination of the processor, wherein
    the autonomous moving body includes no communication device for communicating with the other autonomous moving body, and includes no communication device for communicating with an external management device.

2. The autonomous moving body according to claim 1, wherein when the processor detects that the other autonomous moving body is of the same type as that of the autonomous moving body, the processor determines to avoid the other autonomous moving body based on an avoidance rule that is preset commonly to (i) the autonomous moving body of the same type as that of the autonomous moving body and (ii) the autonomous moving body.

3. The autonomous moving body according to claim 2, wherein
    the external sensor continuously detects the other autonomous moving body and the operation state thereof after the autonomous moving body starts moving along an avoidance path planned based on the avoidance rule, and
    when the processor predicts again that there is a possibility that the autonomous moving body may come into contact with the other autonomous moving body detected by the external sensor, the processor determines whether to further avoid the other autonomous moving body.

4. The autonomous moving body according to claim 1, wherein when the processor detects the other task executed by the other autonomous moving body from the operation state, the processor determines whether to avoid the other autonomous moving body based on a comparison between the task given to the autonomous moving body and the other task.

5. The autonomous moving body according to claim 1, further comprising a presentation unit configured to present, to the outside, an operation state of the autonomous moving body when the autonomous moving body avoids the other autonomous moving body.

6. The autonomous moving body according to claim 1, wherein when the autonomous moving body avoids the other autonomous moving body by the avoidance path in which a proceeding direction of the autonomous moving body is changed to diagonally forward of the moving path, the drive circuit sets a first angle, which is an angle formed by the moving path and a first avoidance path if a distance between the autonomous moving body and the other autonomous moving body is a first distance, in such a way that the first angle becomes larger than a second angle, which is an angle formed by the moving path and a second avoidance path if the distance between the autonomous moving body and the other autonomous moving body is a second distance which is larger than the first distance.

7. A non-transitory computer readable medium storing a control program for an autonomous moving body that moves along a planned moving path in order to execute a given task, the control program causing a computer to execute:
    detecting, using an external sensor, (i) another autonomous moving body to which another task is given and (ii) an operation state thereof;
    predicting, using only data received from the external sensor, that there is a possibility that the autonomous moving body and the other autonomous moving body detected in the detecting may come into contact with each other as they approach each other;
    making a determination, using only the data received from the external sensor, whether to avoid the other autonomous moving body; and
    controlling the autonomous moving body based on the determination in the determining, wherein
    the autonomous moving body includes no communication device for communicating with the other autonomous moving body, and includes no communication device for communicating with an external management device.

\* \* \* \* \*